United States Patent
Sullivan et al.

(10) Patent No.: US 7,917,248 B2
(45) Date of Patent: Mar. 29, 2011

(54) DYNAMIC MARKING SYSTEM

(75) Inventors: Chris Sullivan, Keene, NH (US); Simon Starkey, Ashby de la Zouch (GB); James Cupit, Nottingham (GB); Jacob Harris, Swanzey, NH (US)

(73) Assignee: Markem-Imaje Corporation, Keene, NH (US)

( * ) Notice: Subject to any disclaimer, the term of this patent is extended or adjusted under 35 U.S.C. 154(b) by 0 days.

(21) Appl. No.: 12/326,690

(22) Filed: Dec. 2, 2008

(65) Prior Publication Data
US 2009/0076633 A1    Mar. 19, 2009

Related U.S. Application Data

(63) Continuation of application No. 10/951,418, filed on Sep. 28, 2004, now Pat. No. 7,460,921.

(51) Int. Cl.
*G06F 19/00* (2006.01)
(52) U.S. Cl. .................. 700/280; 700/275
(58) Field of Classification Search ............ 700/75, 700/83, 86; 709/223; 726/28, 17, 4; 358/1.15; 713/176
See application file for complete search history.

(56) References Cited

U.S. PATENT DOCUMENTS

| | | | |
|---|---|---|---|
| 4,705,588 A | 11/1987 | Treiber | |
| 5,823,689 A * | 10/1998 | Nehowig et al. | 400/83 |
| 5,924,802 A * | 7/1999 | Sakurai | 400/61 |
| 6,342,949 B1 | 1/2002 | Terajima | |
| 6,420,790 B1 | 7/2002 | Koizumi | |
| 6,459,860 B1 * | 10/2002 | Childers | 399/12 |
| 6,608,693 B1 * | 8/2003 | Loyd et al. | 358/1.13 |
| 6,738,156 B1 | 5/2004 | Simpson et al. | |
| 6,894,792 B1 * | 5/2005 | Abe | 358/1.15 |
| 7,167,254 B1 * | 1/2007 | Abe | 358/1.15 |
| 7,173,728 B2 * | 2/2007 | Suzuki et al. | 358/1.15 |
| 7,233,404 B2 * | 6/2007 | Meilstrup et al. | 358/1.13 |
| 7,540,237 B2 * | 6/2009 | Kubin et al. | 101/44 |
| 2001/0002574 A1 | 6/2001 | Miyazaki | |
| 2002/0083114 A1 * | 6/2002 | Mazzagatte et al. | 709/100 |
| 2002/0091724 A1 | 7/2002 | Yokoe | |
| 2002/0127020 A1 * | 9/2002 | Childers | 399/12 |
| 2003/0231336 A1 * | 12/2003 | Kim | 358/1.15 |
| 2004/0000744 A1 | 1/2004 | Grigg et al. | |
| 2004/0104361 A1 | 6/2004 | Giuldi et al. | |
| 2004/0143651 A1 * | 7/2004 | Allen et al. | 709/221 |
| 2005/0162697 A1 | 7/2005 | Kiwada | |

OTHER PUBLICATIONS

Bahta, Kidest., Authorized Office, PCT Office, PCT Application No. PCT/US05/34703, filed Sep. 27, 2005, in Search Report and Written Opinion of the International Searching Authority, mailed Jan. 5, 2007, 5 pages.

* cited by examiner

*Primary Examiner* — Kidest Bahta
(74) *Attorney, Agent, or Firm* — Fish & Richardson P.C.

(57) ABSTRACT

A method for configuring a marking device includes, at a control system, establishing communication with the marking device; receiving, from the marking device, information about capabilities of the marking device; presenting the received information about capabilities of the marking device to a user; receiving, from the user, instructions to set machine settings for the marking device; and causing the marking device to be configured according to the instructions received from the user.

15 Claims, 15 Drawing Sheets

Static Text: MARKEM

Data Field (yr) 04

Machine Code: XXXXXXXX

Merged Field: MARKEM04

Code 39:

file: IDM_Image_Complex.idf

```xml
<!--Written by Composer 2004 V1.0.0.0-->
<Legend type="Image.V1" PaperColor="White" BackgroundColor="LightGray">
   <DeviceInfo DeviceURI="NGEDriver[Common]/">
      <DeviceName>SmartDate 5 (Common)</DeviceName>
   </DeviceInfo>
   <Description/>
   <Mirrored>false</Mirrored>
   <Orientation>DEG_0</Orientation>
   <Width>5300</Width>
   <Height>7500</Height>
   <FieldList>
      <AlphaNumeric type="AlphaNum.V1">
         <Name>TEXT_1</Name>
         <ID>1</ID>
         <Geometry>
            <X>250</X>
            <Y>500</Y>
            <Rotation>0</Rotation>
         </Geometry>
         <FieldColor>BLACK</FieldColor>
         <Logged>false</Logged>
         <Text type="TextBased.V1">
            <Inverted>false</Inverted>
            <OverlayMode>MERGE</OverlayMode>
            <Font type="Font.V1">
               <Typeface>Arial</Typeface>
               <CharHeight>400</CharHeight>
               <CharWidth>181</CharWidth>
               <Filename/>
            </Font>
         </Text>
         <Static type="StaticSrc.V1">
            <AppInfo>
               <PropertyBag type="PropertyBag.V1">
                  <Item>
                     <Key>DataSource.PerJobData</Key>
                     <Value type="PerJobData.V1">
                        <PropertyMap/>
                     </Value>
                  </Item>
               </PropertyBag>
```

```xml
            </AppInfo>
            <Text>Static Text:</Text>
          </Static>
        </AlphaNumeric>
      <AlphaNumeric type="AlphaNum.V1">
        <Name>TEXT_2</Name>
        <ID>2</ID>
        <Geometry>
          <X>3000</X>
          <Y>1750</Y>
          <Rotation>0</Rotation>
        </Geometry>
        <FieldColor>BLACK</FieldColor>
        <Logged>false</Logged>
        <Text type="TextBased.V1">
          <Inverted>false</Inverted>
          <OverlayMode>MERGE</OverlayMode>
          <Font type="Font.V1">
            <Typeface>Arial</Typeface>
            <CharHeight>501</CharHeight>
            <CharWidth>225</CharWidth>
            <Filename/>
          </Font>
        </Text>
        <TimeDate type="TimeDateSrc.V1">
          <AppInfo>
            <PropertyBag type="PropertyBag.V1">
              <Item>
                <Key>DataSource.PerJobData</Key>
                <Value type="PerJobData.V1">
                  <PropertyMap/>
                </Value>
              </Item>
            </PropertyBag>
          </AppInfo>
          <TDFormatString>%Y[0,2,2,0]</TDFormatString>
          <LanguageValue>ENGLISH</LanguageValue>
          <OffsetRule>
            <OffsetDays>0</OffsetDays>
            <OffsetMonths>0</OffsetMonths>
            <OffsetYears>0</OffsetYears>
            <OffsetHours>0</OffsetHours>
            <PromptingBehaviour>PROMPT_YY_MM_DD</PromptingBehaviour>
```

```xml
            </OffsetRule>
          </TimeDate>
        </AlphaNumeric>
        <AlphaNumeric type="AlphaNum.V1">
          <Name>TEXT_3</Name>
          <ID>3</ID>
          <Geometry>
            <X>2750</X>
            <Y>2750</Y>
            <Rotation>0</Rotation>
          </Geometry>
          <FieldColor>BLACK</FieldColor>
          <Logged>false</Logged>
          <Text type="TextBased.V1">
            <Inverted>false</Inverted>
            <OverlayMode>MERGE</OverlayMode>
            <Font type="Font.V1">
              <Typeface>Arial</Typeface>
              <CharHeight>501</CharHeight>
              <CharWidth>250</CharWidth>
              <Filename/>
            </Font>
          </Text>
          <MachineSetting type="MachineSetting.V1">
            <AppInfo>
              <PropertyBag type="PropertyBag.V1">
                </Item>
                  <Key>DataSource.PerJobData</Key>
                  <Value type="PerJobData.V1">
                    <PropertyMap/>
                  </Value>
                </Item>
              </PropertyBag>
            </AppInfo>
            <Name>LineID</Name>
          </MachineSetting>
        </AlphaNumeric>
        <AlphaNumeric type="AlphaNum.V1">
          <Name>TEXT_4</Name>
          <ID>4</ID>
          <Geometry>
            <X>2500</X>
            <Y>500</Y>
```

FIG. 7C

```xml
            <Rotation>0</Rotation>
        </Geometry>
        <FieldColor>BLACK</FieldColor>
        <Logged>false</Logged>
        <Text type="TextBased.V1">
            <Inverted>false</Inverted>
            <OverlayMode>MERGE</OverlayMode>
            <Font type="Font.V1">
                <Typeface>Arial</Typeface>
                <CharHeight>437</CharHeight>
                <CharWidth>278</CharWidth>
                <Filename/>
            </Font>
        </Text>
        <Static type="StaticSrc.V1">
            <AppInfo>
                <PropertyBag type="PropertyBag.V1">
                    <Item>
                        <Key>DataSource.PerJobData</Key>
                        <Value type="PerJobData.V1">
                            <PropertyMap/>
                        </Value>
                    </Item>
                </PropertyBag>
            </AppInfo>
            <Text>MARKEM</Text>
        </Static>
    </AlphaNumeric>
    <AlphaNumeric type="AlphaNum.V1">
        <Name>TEXT_5</Name>
        <ID>5</ID>
        <Geometry>
            <X>250</X>
            <Y>1750</Y>
            <Rotation>0</Rotation>
        </Geometry>
        <FieldColor>BLACK</FieldColor>
        <Logged>false</Logged>
        <Text type="TextBased.V1">
            <Inverted>false</Inverted>
            <OverlayMode>MERGE</OverlayMode>
            <Font type="Font.V1">
                <Typeface>Arial</Typeface>
```

FIG. 7D

```xml
                <CharHeight>400</CharHeight>
                <CharWidth>180</CharWidth>
                <Filename/>
              </Font>
            </Text>
            <Static type="StaticSrc.V1">
              <AppInfo>
                <PropertyBag type="PropertyBag.V1">
                  <Item>
                    <Key>DataSource.PerJobData</Key>
                    <Value type="PerJobData.V1">
                      <PropertyMap/>
                    </Value>
                  </Item>
                </PropertyBag>
              </AppInfo>
              <Text>Date Field (yr):</Text>
            </Static>
          </AlphaNumeric>
          <AlphaNumeric type="AlphaNum.V1">
            <Name>TEXT_6</Name>
            <ID>6</ID>
            <Geometry>
              <X>250</X>
              <Y>2750</Y>
              <Rotation>0</Rotation>
            </Geometry>
            <FieldColor>BLACK</FieldColor>
            <Logged>false</Logged>
            <Text type="TextBased.V1">
              <Inverted>false</Inverted>
              <OverlayMode>MERGE</OverlayMode>
              <Font type="Font.V1">
                <Typeface>Arial</Typeface>
                <CharHeight>400</CharHeight>
                <CharWidth>112</CharWidth>
                <Filename/>
              </Font>
            </Text>
            <Static type="StaticSrc.V1">
              <AppInfo>
                <PropertyBag type="PropertyBag.V1">
                  <Item>
```

FIG. 7E

```xml
                    <Key>DataSource.PerJobData</Key>
                    <Value type="PerJobData.V1">
                        <PropertyMap/>
                    </Value>
                </Item>
            </PropertyBag>
        </AppInfo>
        <Text>Machine Code:</Text>
    </Static>
</AlphaNumeric>
<AlphaNumeric type="AlphaNum.V1">
    <Name>TEXT_7</Name>
    <ID>7</ID>
    <Geometry>
        <X>250</X>
        <Y>3750</Y>
        <Rotation>0</Rotation>
    </Geometry>
    <FieldColor>BLACK</FieldColor>
    <Logged>false</Logged>
    <Text type="TextBased.V1">
        <Inverted>false</Inverted>
        <OverlayMode>MERGE</OverlayMode>
        <Font type="Font.V1">
            <Typeface>Arial</Typeface>
            <CharHeight>400</CharHeight>
            <CharWidth>204</CharWidth>
            <Filename/>
        </Font>
    </Text>
    <Static type="StaticSrc.V1">
        <AppInfo>
            <PropertyBag type="PropertyBag.V1">
                <Item>
                    <Key>DataSource.PerJobData</Key>
                    <Value type="PerJobData.V1">
                        <PropertyMap/>
                    </Value>
                </Item>
            </PropertyBag>
        </AppInfo>
        <Text>Merged Field:</Text>
    </Static>
```

FIG. 7F

```xml
      </AlphaNumeric>
      <AlphaNumeric type="AlphaNum.V1">
        <Name>TEXT_8</Name>
        <ID>8</ID>
        <Geometry>
          <X>2500</X>
          <Y>3750</Y>
          <Rotation>0</Rotation>
        </Geometry>
        <FieldColor>BLACK</FieldColor>
        <Logged>false</Logged>
        <Text type="TextBased.V1">
          <Inverted>false</Inverted>
          <OverlayMode>MERGE</OverlayMode>
          <Font type="Font.V1">
            <Typeface>Arial</Typeface>
            <CharHeight>501</CharHeight>
            <CharWidth>200</CharWidth>
            <Filename/>
          </Font>
        </Text>
        <Merged type="MergedSrc.V1">
          <AppInfo>
            <PropertyBag type="PropertyBag.V1">
              <Item>
                <Key>DataSource.PerJobData</Key>
                <Value type="PerJobData.V1">
                  <PropertyMap/>
                </Value>
              </Item>
            </PropertyBag>
          </AppInfo>
          <SubField>
            <FieldID>4</FieldID>
            <StartIndex>0</StartIndex>
            <Length>0</Length>
          </SubField>
          <SubField>
            <FieldID>2</FieldID>
            <StartIndex>0</StartIndex>
            <Length>0</Length>
          </SubField>
        </Merged>
```

FIG. 7G

```xml
......</AlphaNumeric>
......<AlphaNumeric type="AlphaNum.V1">
........<Name>CODE_39_1</Name>
........<ID>9</ID>
........<Geometry>
..........<X>2750</X>
..........<Y>4750</Y>
..........<Rotation>0</Rotation>
........</Geometry>
........<FieldColor>BLACK</FieldColor>
........<Logged>false</Logged>
........<Code39 type="Code39.V1">
..........<Inverted>false</Inverted>
..........<OverlayMode>MERGE</OverlayMode>
..........<BarHeight>750</BarHeight>
..........<QuietMargin>false</QuietMargin>
..........<NarrowBarWidth>8</NarrowBarWidth>
..........<AutoCheckDigit>false</AutoCheckDigit>
..........<TextDisplayOptions>DISPLAY_DATA</TextDisplayOptions>
........</Code39>
........<Static type="StaticSrc.V1">
..........<AppInfo>
............<PropertyBag type="PropertyBag.V1">
..............<Item>
................<Key>DataSource.PerJobData</Key>
................<Value type="PerJobData.V1">
..................<PropertyMap/>
................</Value>
..............</Item>
............</PropertyBag>
..........</AppInfo>
..........<Text>01234567S</Text>
........</Static>
......</AlphaNumeric>
......<AlphaNumeric type="AlphaNum.V1">
........<Name>TEXT_9</Name>
........<ID>10</ID>
........<Geometry>
..........<X>250</X>
..........<Y>4750</Y>
..........<Rotation>0</Rotation>
........</Geometry>
........<FieldColor>BLACK</FieldColor>
```

FIG. 7H

```xml
            <Logged>false</Logged>
            <Text type="TextBased.V1">
              <Inverted>false</Inverted>
              <OverlayMode>MERGE</OverlayMode>
              <Font type="Font.V1">
                <Typeface>Arial</Typeface>
                <CharHeight>501</CharHeight>
                <CharWidth>200</CharWidth>
                <Filename/>
              </Font>
            </Text>
            <Static type="StaticSrc.V1">
              <AppInfo>
                <PropertyBag type="PropertyBag.V1">
                  <Item>
                    <Key>DataSource.PerJobData</Key>
                    <Value type="PerJobData.V1">
                      <PropertyMap/>
                    </Value>
                  </Item>
                </PropertyBag>
              </AppInfo>
              <Text>Code 39:</Text>
            </Static>
          </AlphaNumeric>
      </FieldList>
      <AppInfo>
        <PropertyBag type="ImagePropertyBag.V1">
          <RemotingMap type="RemotingInfoList.V1">
            <RemotingLinks/>
          </RemotingMap>
        </PropertyBag>
      </AppInfo>
</Legend>
```

FIG. 7I

DYNAMIC MARKING SYSTEM

RELATED APPLICATION

This application is a continuation of U.S. application Ser. No. 10/951,418, filed Sep. 28, 2004, and issued on Dec. 2, 2008 as U.S. Pat. No. 7,460,921. The contents of the foregoing application are incorporated herein by reference.

BACKGROUND

This invention relates to automatic product marking.

Automatic marking is used in production facilities, for example, to mark individual consumer units, boxes of units for delivery (dispatch units), as well as whole pallets of boxes (pallet units). Automatic marking can include such functions as marking the units with production and expiry dates, product bar code, measured unit weights, etc. For example, in a candy bar factory, the wrapping for individual candy bars may be marked with the manufacturing date, an expiry date, and an identification of the plant and line on which the candy bar was produced. Similarly, cases of candy bars may be similarly marked. Pallets of various candy bars may be marked according to their intended destination, as well as by the content of the pallet.

Products are increasingly being marked with information that is more specific. For example, the weight of individual food packages may be marked on each package or specific serial numbers may be assigned to individual packages. For example, a unit of cheese may be marked with the individual weight of the package. There is a need to be able to control and record the markings on the units to allow them to be tracked and to integrate the markings with other systems, such as inventory control systems and warehousing applications.

The markings on a product may be applied to pre-printed packaging, such as to cardboard boxes or foil wrappers, or may be applied to labels, which are then applied to the unit. Increasingly, the markings also include radio-frequency-identification tags (RFID tags), for example, that include specific identifying information for each unit that is tagged.

SUMMARY

In one aspect, the invention features a method for configuring a marking device. The method, which is carried out by a control system, includes establishing communication with the marking device; receiving, from the marking device, information about capabilities of the marking device; presenting the received information about capabilities of the marking device to a user; receiving, from the user, instructions to set machine settings for the marking device; and causing the marking device to be configured according to the instructions received from the user.

Among the practices of the invention are those in which receiving information about the capabilities of the marking device includes receiving a device capabilities file, receiving a file identifying parameters available to be set on the marking device from the control system, receiving a file identifying allowable ranges of values for parameters available to be set on the marking device from the control system, receiving a file identifying rules that determine modes in which a parameter is applied, receiving a file identifying documentation on the use of parameters available on the marking device for use by the user interface on the control system, or receiving an XML file from the marking device. In all the foregoing cases, the received file may overwrite an existing file.

Certain practices of the method further include presenting a user-interface to an operator, and receiving, through that user-interface, machine parameters to be communicated to the marking device.

In some practices of the method, transmitting the machine settings includes sending an XML document to the marking device.

Practices of the method include those in which presenting the information about capabilities of the marking device includes presenting a user-interface for configuring the marking device based on the received information about capabilities of the marking device.

Alternative practices of the method also include those in which causing the marking device to be configured using the machine settings includes transmitting the machine settings to the marking device.

In another aspect, the invention features a system for configuring a marking device. The system includes a processor for executing instructions; a communication interface for establishing communication with the marking device for receiving, from the marking device, a specification of device specific characteristics representative of capabilities of the marking device, and transmitting, to the marking device, device settings indicative of a desired configuration; a storage medium in data communication with the processor for storing a specification of device-specific characteristics received from the marking device; and a user-interface for displaying to a user, the specification of device-specific characteristics from the marking device that was received from the marking device and stored on the storage medium, and receiving, from the user, instructions for configuring the marking device.

In yet another aspect, the invention features a computer-readable medium having encoded thereon software for configuring a marking device. The software includes instructions for: enabling a control system to receive, from the marking device, information about capabilities of the marking device; presenting the information about capabilities of the marking device to a user; and receiving, from the user, machine settings for the marking device for transmission to the marking device.

Embodiments of the computer-readable medium include software having instructions for causing any of the steps enumerated in the foregoing discussion of method steps.

DESCRIPTION OF DRAWINGS

FIGS. 7A-7I are an XML image specification corresponding to the label of FIG. 6.

DESCRIPTION

Figure 1:
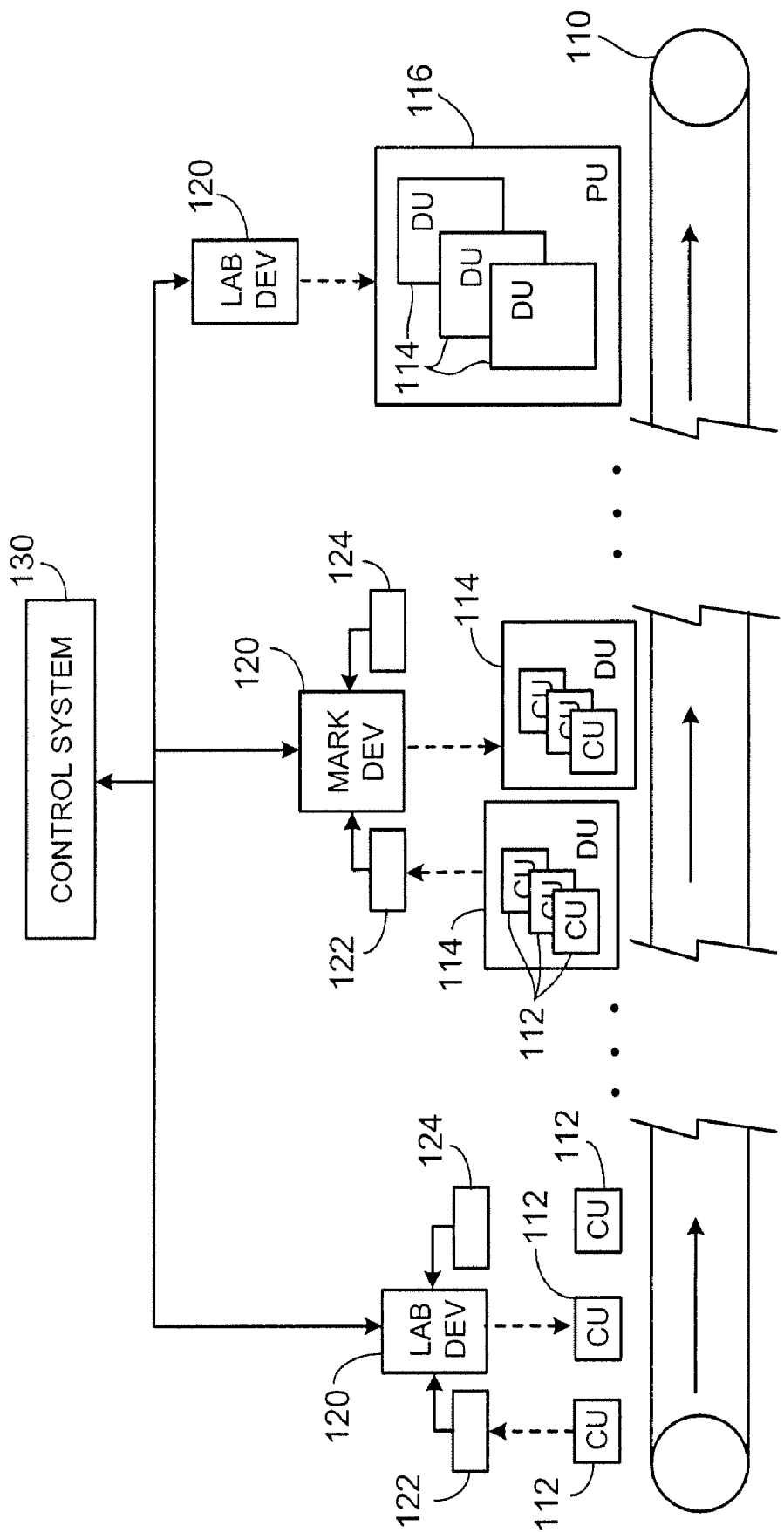
FIG. 1 is a diagram that illustrates a marking system for a production facility.

Referring to FIG. 1, a production facility includes a number of production lines on which various types of units are packaged and marked. Marking (which is sometimes also referred to as "coding") can involve making visible marks directly on pre-printed packaging, for example, using thermal, laser, or ink-jet printing techniques to marking cardboard or film packaging. Marking a unit can also involve marking a separate label or tag (e.g., an RFID tag), and then affixing the label or tag to the unit.

As a representative example of such a facility, a production line 110 includes a section in which consumer units 112 are packaged and marked. A marking device 120 prints on pre-printed packaging or on labels that are used to mark each of the units. For example, in the case of a candy bar, the marking device 120 may print on a reserved (e.g., white background) portion of a pre-printed film wrapper in which then candy bar is wrapped. The marking device is able to add specific information for the consumer unit, for example, a product barcode, a packaging date, an expiry date, and encoded information identifying the production facility, specific production line, and shift within the day. For some types of consumer units, a sensor such as a barcode scanner, RFID reader, or scale, is used to extract information about a consumer unit, and that information is passed to the marking device to modify the marking to be added to the device. For example, a weight of the unit may be printed on the packaging for the unit. Another sensor 124 can be used to verify information marked on the unit after it has passed by the marking unit. For example, a barcode scanner can be used to determine whether the printing of a barcode was performed successfully. The information printed by the marking device as well as the result of this post-scanning can be logged, for example, to keep track of the which markings were successful, and can also be used to control the production line, for example, rejecting specific units that are improperly marked or by shutting down the line (for example, if the printer is not successfully printing barcodes on the units). Another example of post-scanning might be the reading of RFID tag identifiers, and logging those identifiers for populating a database that associates the identifiers with characteristics of the units (e.g., what kind of candy bar).

The marking process may occur at a number of different points in a production facility. As described above, individual consumer units 112 may be labeled. For example, 200-600 units per minute may be processed by a marking device for consumer units. Consumer units may be packaged into dispatch units. For example, candy bars may be arranged into boxes. The boxes may also be labeled, for example, by printing directly on the outside of the box, or affixing a label that is printed for the box. For example, 10-50 boxes per minute may be processed on a production line. Similarly, various distribution units may be assembled onto a palette, for example, for shipment to a particular customer. Again, the palettes themselves may be labeled, for example, with printed labels or RFID tags that are attached to the wrapped palette. For example, 1-5 pallets may be processed per minute on a line.

In some versions of the system, a control system 130 controls the operation of the marking devices 120. In such a system, each marking device 120 is linked to the control system 130 by a communication link, such as serial communication link. Alternatively, the marking devices 120 and the control system 130 are all linked over a communication network, such as a local or wide are data communication network (e.g., Ethernet). In other versions of the system, each of the marking devices can be individually configured without the use of a centralized control system. For example, each marking device provides a screen-based interface that allows an operator to configure the device. In addition, data, such as specifications of the images to be marked on the units, may be provided from external sources for example on removable data media.

Figure 2:
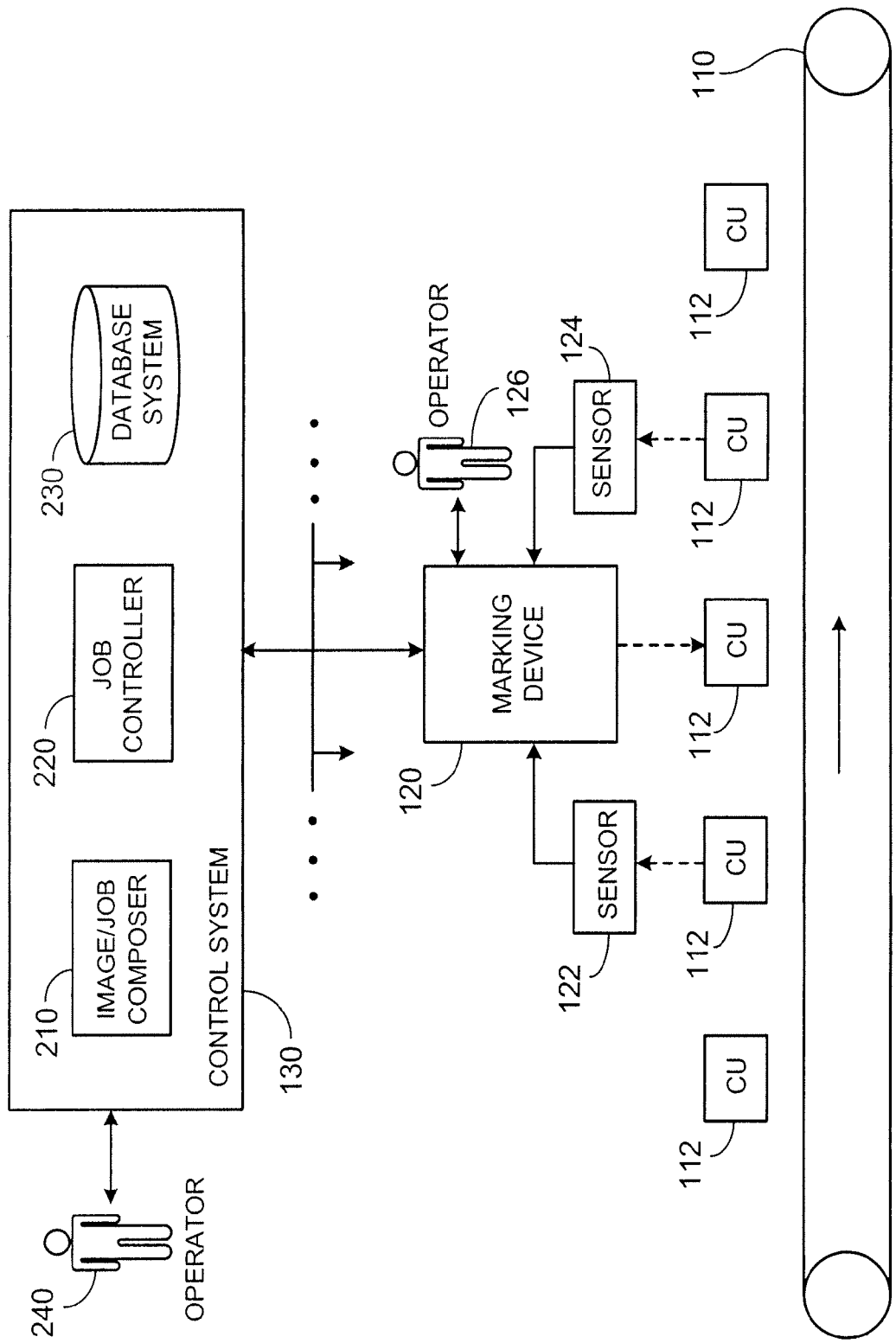
FIG. 2 is a diagram that illustrates a portion of the marking system.

Referring to FIG. 2, an operator 126 is able to configure certain aspects of the marking device 120. For example, a number of parameters may be set at the time a device is installed in a production facility or by the operator on the floor of the production facility, such as an identifier of the specific production line, and those parameters can affect the specific markings that are produced by the marking device. For example, an identifier of the production line, which is then marked on the units processed by the marking device, may be set at the time the device in installed. As another example, the operator 126 may adjust the location (e.g., registration) of the printing and print characteristics such as the darkness of the printing before the start of a job or as an adjustment during a production run.

The control system 130 also accepts inputs from one or more operators. For example, an operator 240 can make use of an image/job composer 210 to specify characteristics of a marking job. The characteristics can include the graphic design of a label or wrapper, and include specifications of the information and its placement and format on the label or wrapper. For example, the location of a production date as well as its format, type face and size, etc. is specified by the operator. A job controller 220 coordinates the marking process, for example, providing information to the marking devices 120 during a production run for use in marking the units. A database 230 includes information that is used to determine the information that is marked on the units, or to hold information recoding the marking of produced units.

Figure 3:
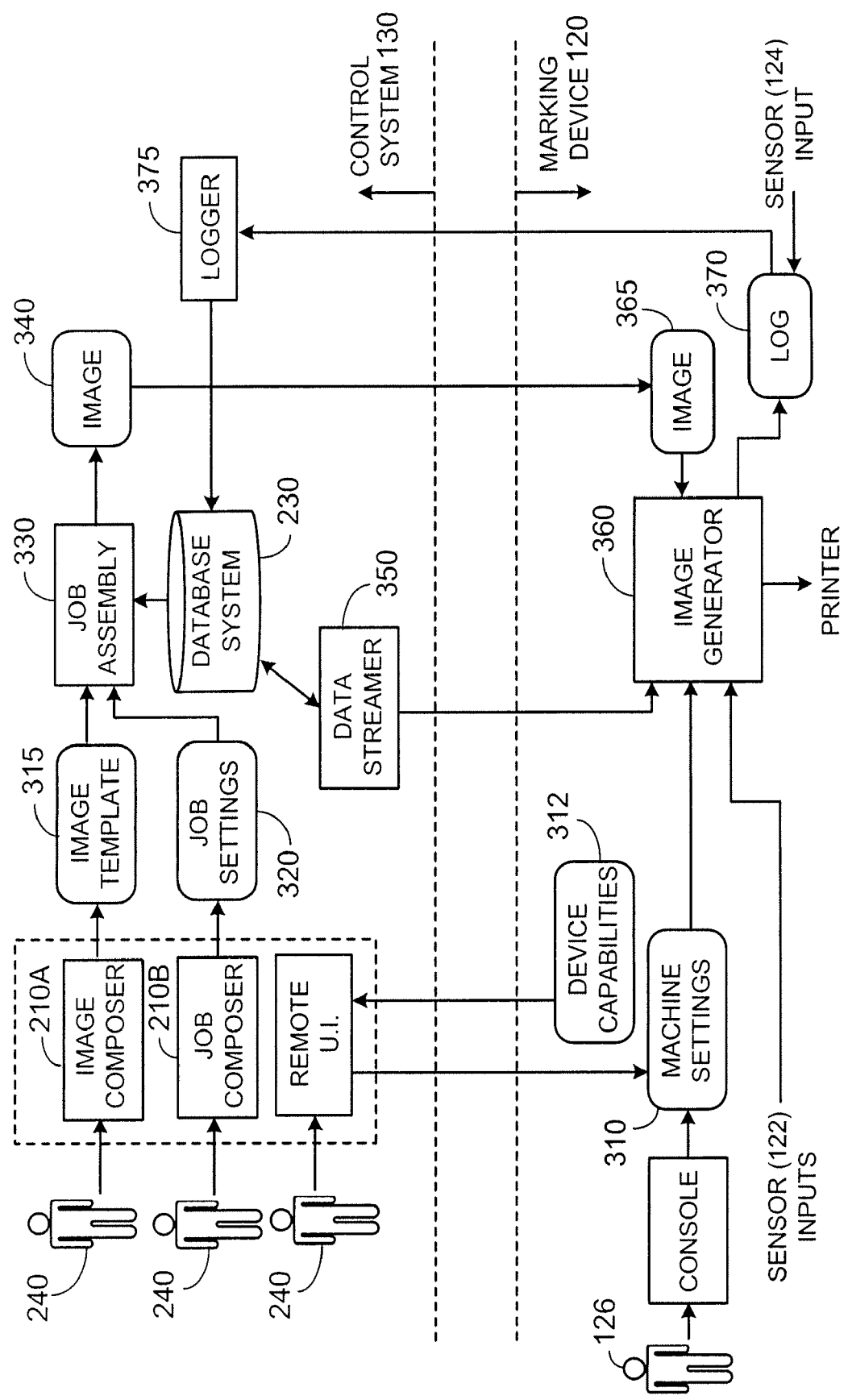
FIG. 3 is a data flow diagram for generation of markings for a unit.

Referring to FIG. 3, the process of controlling the images generated by a printer in the marking device 130 makes use of information from a number of different sources. An operator 240 uses an image composer to specify an image template 315, which includes a design for a label or wrapper, but is not necessarily specific to a particular product. For example, the labels for boxes of chocolate bars may be largely the same for different types of chocolate bars. For a particular production run, the operator 240 specifies job settings 320, including specifying some of the values that are unspecified in the image template. An example of such a value is the product name. A job assembly component 330 combines the image template and the jobs settings 320 to form an image 340, which is a data specification of what is to be printed on the label or wrapper of the unit on the production line. The job assembly component can make use of the database system 230, for example, to obtain product information based on a product code specified in the jobs settings 320. Note that the image 340 in general includes specification of data fields the values of which are not yet specified at that point. For example, fields corresponding to the date, the identifier of the production line, an RFID tag identifier, etc. are represented as data items.

At the marking device, an operator 126 uses a console to set machine settings 310 for the marking device 120. For example, a machine setting can include data such as an identifier of a production line, and can include settings related to the printing process, such as a darkness setting for a printer. An operator 240 at the control system can alternatively remotely set machine parameters for the marking device. In order to accommodate new parameters without having to update the software in the control system, the marking device provides device capabilities 312 to the control system. The device capabilities 312 is a file that identifies parameters, documentation of the use of the parameters, rules that determine in which modes various parameters are copies, and allowable values or ranges of values for the parameters. A remote user interface component in the control system presents a user interface to the operator, who sets the machine parameters. The machine settings are then sent from the control system to the marking device, thereby avoiding the need for the operator to physically go to the marking device.

The image 340 is transferred over the communication link coupling the control system to the marking device and stored as an image 365 in the memory of the marking device. An image generator component 360 of the marking device uses the transferred image 365 as well as other information to drive a printer that produces the labels or wrappers for the units being produced on the production line. The image generator 360 can make use of information that is not particularly specified in the image 365. For example, data from the machine settings 310 can be combines with the image 365 to drive the printing of the labels.

In addition to relatively static information that is encoded in the image 365 or is static or generated at the marking device, the image generator can make use of data that is passed from the control system. An example of such data is a series of serial numbers that are to be marked on sequential units on the production line. In order to avoid a need to request the information for each unit in turn, and thereby potentially limiting a speed of the production line based on the responsiveness of the control system, the information is streamed to the marking device ahead of when it is needed. For example, serial numbers can be provided to the marking device in batches, on request from the marking device, or the serial numbers may be streamed without solicitation to the marking device. The image generator then combines the inbound streamed information with the image 365 to make each label, which in such a case is generally unique to each unit.

An example of use of streaming data is marking of contest information on units. For example, a marking may be made on each unit (e.g., inside the wrapper) that indicates whether that unit is a "winner." In such applications, it may be important to carefully control which markings are made, for example, to make sure that there is only a single winner and to keep track of the distribution of the winning unit.

In addition to using data streamed from the control system, the marking device makes use of data from a sensor 122 to complete the marking specified by the image 365. For example, the image may specify that a data item be obtained from the sensor for marking on a unit. An example is a weight sensor that provides the weight of each unit to the marking device, and this weight is provided to the image generator, which places that weight information into the label as specified by the image 365 for the units. In addition to specifying the source of data for the various fields, the image 365 may specify how the data is to be manipulated. For example, for numerical data, an arithmetic transformation may be specified. Such a transformation can be used to mark a price based on a weight (e.g., based on a price per pound) or to mark the weight in different units (e.g., grams versus ounces). For date fields, the image can specify the format of the date, such as the order and representation of the day, month, and year portions of the date. These types of marking can be used to weigh packages of cheese and mark the package with the weight in desired units, a price at a desired price and currency, and an expiry date in a desired format.

The image generator 260 generates a log 370, which may also include information from a sensor 124, such as a post-marking scanner. The log stores information that identifies the specific data that is marked on the units. For example, when the marking device uses data, such as machine settings, internally generated serial numbers, sensed characteristics of the units (e.g., weight), or data streamed from the control system, the log provides information that allows the specific values on each unit to be recorded and then uploaded to a logger component 375 at the control system.

Figure 4:
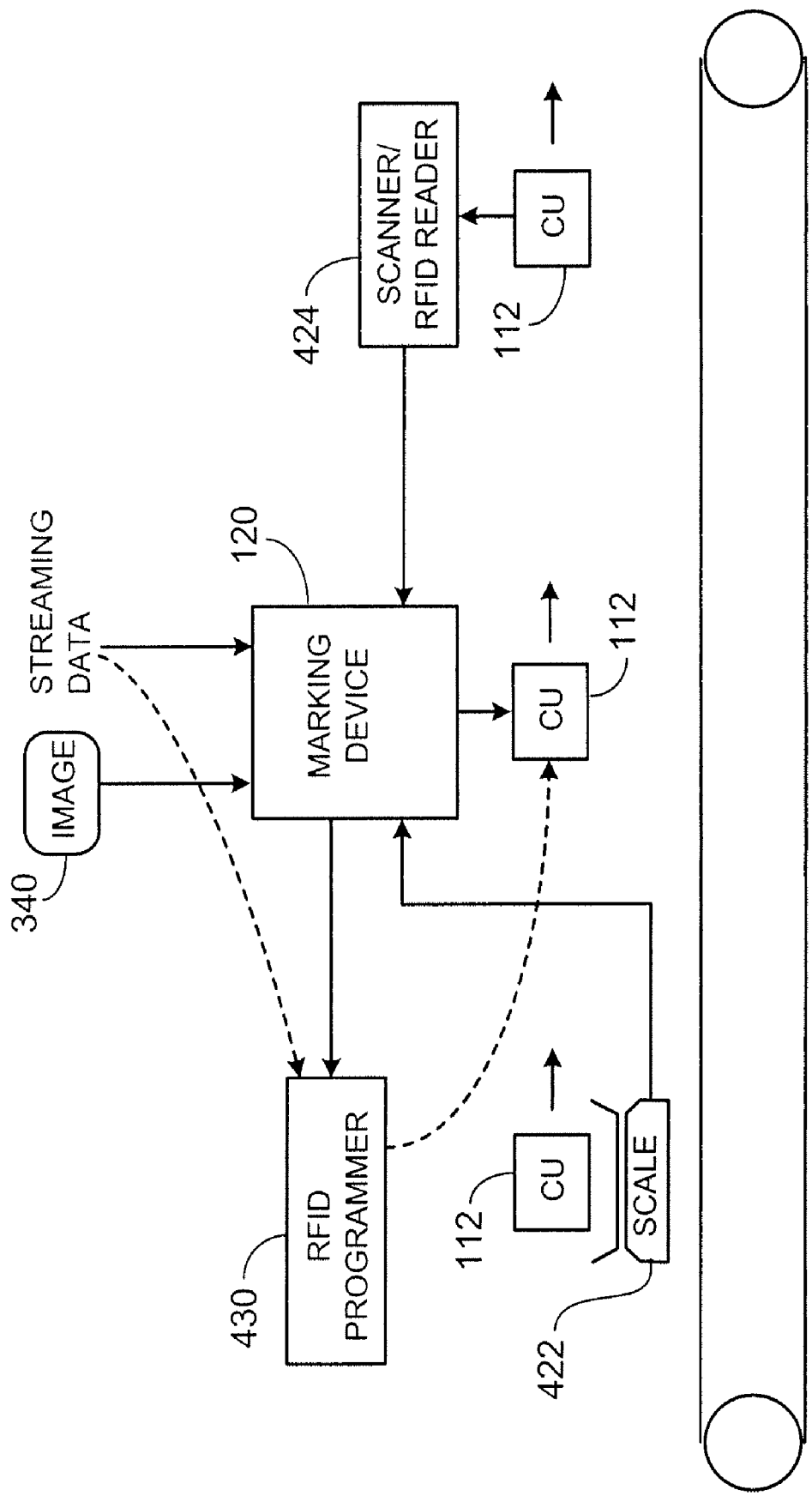
FIG. 4 is a diagram of an example of a marking device.
Figure 5:
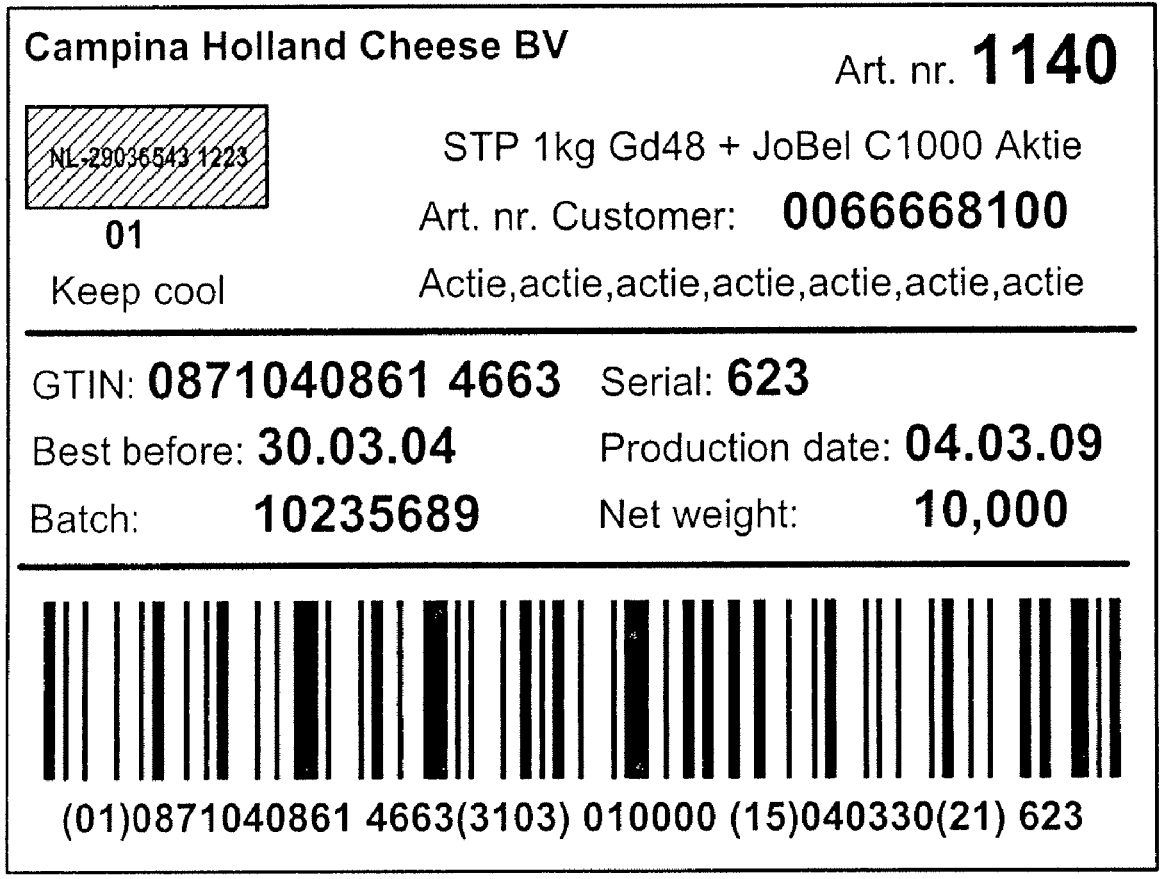
FIG. 5 is an image of a label.

Referring to FIG. 4, as an example of the process illustrated in FIG. 3. FIG. 5 shows an example of a label that is produced by such a process. Consumer units, such as an individually wrapped food product (e.g., packages of cheese), are marked according to a image 340 which specifies which information is to be marked on the units and the placement and format of that marking. In this example, determining the information for marking the unit involves each unit 112 being weighed by a scale 422. The weight is provided directly to the marking device 120, for example, over a serial communication interface using a text data format. In this example, an RFID tag is affixed to each unit, and the control system streams batches of serial numbers to an RFID programmer 430 either via the marking device 120 or directly to the programmer 430. The control system also streams other data, such as serial numbers to the marking device 120 for printing on the unit. As the unit 112 passes the device, the printer in the device 120 marks the packaging for the unit and affixes the programmed RFID tag. The information marked or tagged on the unit is logged and the log is streamed or periodically uploaded to the control system. Optionally, a scanner or RFID reader 424 scans the units after they have been marked, and this information is logged and uploaded to the control system.

Figure 6:
FIG. 6 is an image of a label.

In one implementation of the system and the dataflow illustrated in FIG. 3, various of the intermediate files make use of XML (eXtensible Markup Language) documents and associated schema or document definitions. For example, the image template 315, job settings 320, and image 340 are stored as XML documents. Similarly, the device capabilities 312 and machine settings 310 are also stored and transmitted as XML documents. In the case of the image files, the elements of the XML file can represent separate graphical elements, such as images or generated graphics with the specification or source of the element being included in the XML file. Data elements (e.g., serial numbers, weights, dates) can include a specification of the source of the data, for example, by an identifier, as well as a format specification for rendering the data. The specification can also include expressions for computing data items, for example, using an arithmetic expression to compute a derived quantify (e.g., a price based on a weight and a price per unit weight). Referring to FIG. 6 and example of a label corresponds to an XML-specified image shown in FIGS. 7A-7I.

In an alternative approach, the image specification may include specification of procedural elements (e.g., executable statements, scripts, macros, etc.) that are used to determine markings at production time, for example, including procedural statements that are executed at the marking device. In another implementation of the system, the image data can include more of the packaging image itself. With adequate printing technology, the entire packaging may be printed by the marking device rather that using pre-printed packaging with reserved portions for use by the marking device. Other data formats than XML can alternatively be used. For example, an image specification based on a printer description language such as Postscript or Printer Control Language (PCL) (suitably extended to allow for insertion of data items such as at the marking device) or based on a markup language such as HTML can alternatively be used.

Communication between various components of the control system, and between the control system and the marking devices optionally makes use of a web services (".NET") approach in which components and devices are implemented as services that receive requests with XML-encoded data and provide responses with similarly encoded data. In some versions of the system, various of the communication between components makes use of SOAP-based encapsulation of the requests and responses, allowing the components to be geographically distributed, and separated by security firewalls.

Versions of the system can be implemented in software or in hardware, or using a combination of software or hardware. The software can include instructions (e.g., program language statements in a compiled or interpreted language, machine instructions, or byte codes for a virtual machine) for execution of general-purpose or special purpose computers. The software may be provided on computer-readable media (e.g., optical or magnetic disks) or provided over a data channel (e.g., on a data signal propagated over a data network). By way of example, the marking devices can include special-purpose computers that execute a real-time operating system, and the control system can include general-purpose computers (e.g., personal computers) that host various software components of the system.

It is to be understood that the foregoing description is intended to illustrate and not to limit the scope of the invention, which is defined by the scope of the appended claims. Other embodiments are within the scope of the following claims.

What is claimed is:

1. A method for configuring a marking device, the method comprising:
    at a control system, establishing communication with, the marking device;
    at the control system, receiving, from the marking device, information about capabilities of the marking device, the information comprising parameters available to be set on the marking device and documentation regarding use of the parameters available to be set on the marking device;
    at the control system, presenting the received information about capabilities of the marking device to a user;
    at the control system, receiving, from the user, instructions to set machine settings which correspond to the parameters, for the marking device; and
    causing the marking device to be configured according to the instructions received from the user.

2. The method of claim 1, wherein receiving information about the capabilities of the marking device comprises receiving a device capabilities file.

3. The method of claim 2, further comprising over-writing an existing device capabilities file at the control system.

4. The method of claim 1, wherein receiving information about the capabilities of the marking device comprises receiving a file identifying allowable ranges of values for the parameters available to be set on the marking device from the control system.

5. The method of claim 1, wherein receiving information about the capabilities of the marking device comprises receiving a file identifying rules that determine modes in which a parameter is applied.

6. The method of claim 1, further comprising:
    presenting a user-interface to an operator, and
    receiving, through the user-interface, machine parameters to be communicated to the marking device.

7. The method of claim 1, wherein causing the marking device to be configured using the machine settings comprises transmitting the machine settings to the marking device.

8. The method of claim 1, wherein receiving information about the capabilities of the marking device comprises receiving an XML file from the marking device.

9. The method of claim 1, wherein presenting the information about capabilities of the marking device comprises presenting a user-interface for configuring marking device based on the received information about capabilities of the marking device.

10. The method of claim 7, wherein transmitting the machine settings comprises sending an XML document to the marking device.

11. A system for configuring a marking device, the system comprising:
    a processor for executing instructions;
    a communication interface for establishing communication with the marking device for receiving, from the marking device, a specification of device specific characteristics representative of capabilities of the marking device, and transmitting, to the marking device, device settings indicative of a desired configuration;
    a storage medium in data communication with the processor for storing the specification of device-specific characteristics received from the marking device; and
    a user-interface for displaying to a user, the specification of device-specific characteristics from the marking device that was received from the marking device and stored on the storage medium, and receiving, from the user, instructions for configuring the marking device;
    wherein the device specific characteristics representative of capabilities of the marking device comprise parameters available to be set on the marking device and documentation regarding use of the parameters available to be set on the marking device, the instructions correspond to the device settings indicative of the desired configuration, and the device settings indicative of the desired configuration correspond to the parameters.

12. A computer-readable medium having encoded thereon software for configuring a marking device, the software comprising instructions for:
    enabling a control system to receive, from the marking device, information about capabilities of the marking device;
    presenting the information about capabilities of the marking device to a user; and
    receiving, from the user, machine settings for the marking device for transmission to the marking device;
    wherein the information comprises parameters available to be set on the marking device and documentation regarding use of the parameters available to be set on the marking device, and the machine settings received from the user correspond to the parameters.

13. The computer-readable medium of claim 12, wherein the software further comprises instructions for causing the marking device to be configured according to the machine settings received from the user.

14. The computer-readable medium of claim 12, wherein the instructions for presenting the information about capabilities of the marking device comprise instructions for presenting a user-interface for configuring the marking device based on the received information about capabilities of the marking device.

15. The computer-readable medium of claim 12, wherein the instructions for presenting the information about capabilities of the marking device comprise instructions for retrieving an XML file, and presenting information from the XML file to a user through a user-interface.

* * * * *

UNITED STATES PATENT AND TRADEMARK OFFICE
CERTIFICATE OF CORRECTION

| | |
|---|---|
| PATENT NO. | : 7,917,248 B2 |
| APPLICATION NO. | : 12/326690 |
| DATED | : March 29, 2011 |
| INVENTOR(S) | : Chris Sullivan et al. |

It is certified that error appears in the above-identified patent and that said Letters Patent is hereby corrected as shown below:

Column 7, line 27, Claim 1, delete "with," and insert -- with --, therefor.

Column 7, line 38, Claim 1, after "settings" insert -- , --.

Column 8, line 3, Claim 9, after "configuring" insert -- the --.

Signed and Sealed this
Thirty-first Day of May, 2011

David J. Kappos
*Director of the United States Patent and Trademark Office*